United States Patent [19]

Hess

[11] 4,026,722

[45] May 31, 1977

[54] EXTENDED PIGMENTARY BIVO$_4$ COMPOSITION

[75] Inventor: Richard William Hess, Wilmington, Del.

[73] Assignee: E. I. Du Pont de Nemours and Company, Wilmington, Del.

[22] Filed: June 22, 1976

[21] Appl. No.: 698,693

[52] U.S. Cl. .............................. 106/288 B; 423/593
[51] Int. Cl.$^2$ .......................................... C09C 1/62
[58] Field of Search ................. 106/288 B; 423/593

[56] References Cited

UNITED STATES PATENTS 2,658,833  11/1953  Coffeen et al. .................... 423/593

FOREIGN PATENTS OR APPLICATIONS 422,947  12/1925  Germany .......................... 423/593

OTHER PUBLICATIONS

Indian Chemical Society Journal; vol. 8, 1931 pp. 289–292.

*Primary Examiner*—Winston Douglas
*Assistant Examiner*—J. V. Howard

[57] ABSTRACT

A composition containing BiVO$_4$, Al$_2$O$_3$, and SiO$_2$, which is useful as a yellow pigment, and a process for the preparation thereof.

10 Claims, No Drawings

EXTENDED PIGMENTARY BIVO₄ COMPOSITION

BACKGROUND OF THE INVENTION

This invention relates to a composition consisting essentially of $BiVO_4$, $Al_2O_3$, and $SiO_2$ which is useful as a yellow pigment, and a process for the preparation thereof.

A pigment is an insoluble small particle solid which is incorporated in paints, plastics, and inks to impart color and/or opacity. Ideally, a pigment should have strength, that is, a low color pigment requirement when mixed with a white pigment to make tints; intensity, that is, purity of shade and absence of dullness or grayness; lightfastness, that is, resistance to color change when exposed to sunlight in a pigmented article; and resistance to bleed, that is, low migration of color in a pigmented article. In addition for many applications it is desirable that a pigment have good hiding power, that is, ability to impart efficient opacifying power to a pigmented article.

The major intense yellow pigments currently used are lead chromate, cadmium sulfide, nickel titanate and a number of organic materials such as certain azo compounds. Lead chromate and cadmium sulfide have good hiding, however, presently there is a trend away from using these compounds because of their possible toxicity. Nickel titanate has good hiding power but it does not have the strength or high intensity desired in a high performance pigment. The organic pigments generally exhibit high strength, but poor hiding and frequently poor bleed resistance.

Thus there is a need for a nontoxic, high hiding, yellow pigment which also has good strength, high intensity, good lightfastness, and good resistance to bleed in organic solvents or vehicles.

Various references have described the synthetic preparation of bismuth vanadate, for example, I. M. Gottlieb and C. R. Rowe, "Preparation and Thermal Properties of Bismuth Orthovanadate", *Thermal Analysis*, Vol. 2, Proceedings Third ICTA DAVOS (1971), pp. 303–311; R. S. Roth and J. L. Waring, "Synthesis and Stability of Bismutotantalite, Stibiobantalite and Chemically Similar $ABO_4$ Compounds", *The American Mineralogist*, Vol. 48 (Nov.–Dec. 1963) pp. 1348–56; H. E. Swanson et al., "Standard X-Ray Diffraction Powder Patterns", *National Bureau of Standards Report*, No. 7592 (Aug. 1962); Eduard Zintl and Ludwig Vanino, "Process For The Manufacture of Pure Bismuth Vanadate", German Pat. No. 422,947 (1925). However, none of the above were successful in preparing bismuth vanadate or a composition containing bismuth vanadate as a bright yellow pigment.

SUMMARY OF THE INVENTION

This invention relates to a composition of the general formula

$BiVO_4.xAl_2O_3.ySiO_2$ wherein $x$ and $y$ represent moles of $Al_2O_3$ and $SiO_2$, respectively, per mole of $BiVO_4$, $x$ is about 0.25–2.0, $y$ is about 0.1–3.5, and $x$ plus $y$ is equal to or greater than 1.

Further, the present invention relates to a process for preparing a composition consisting essentially of $BiVO_4$, $Al_2O_3$, and $SiO_2$, comprising: mixing $Bi_2O_3$, $NH_4VO_3$ or $V_2O_5$, $x.Al_2O_3$ and $y.SiO_2$, wherein the Bi and V are present in equimolar amounts, $x$ and $y$ represent moles of $Al_2O_3$ and $SiO_2$, respectively, per mole of $BiVO_4$, $x$ is about 0.25–2.0, $y$ is about 0.1–3.5, and $x$ plus $y$ is equal to or greater than 1; and heating the mixture at about 800°–1100° C. for about 0.5–5.0 hours.

DETAILED DESCRIPTION OF THE INVENTION

This invention relates to a composition and a process for preparing a composition consisting essentially of $BiVO_4$, $Al_2O_3$, and $SiO_2$ which is useful as a yellow pigment. The pigments of the present invention have high hiding and intensity, good strength, good lightfastness, good bleed resistance, good resistance to alkalis, and are nontoxic.

In the composition of the present invention, $BiVO_4$ has a monoclinic crystal structure as determined by X-ray diffraction. The amount of alumina and silica present is about 0.25–2.0 and 0.1–3.5 moles, respectively, per mole of $BiVO_4$, and further the moles of alumina plus the moles of silica must be equal to or greater than 1. The preferred amounts of alumina and silica are 1.0–2.0 and 0.25–2.0, respectively, and the preferred value of the moles of alumina plus moles of silica is 1.0–4.0. These values are preferred because they yield a composition with an excellent primrose yellow color and with good strength.

The preferred crystalline forms of alumina in the composition of the present invention are alpha, kappa, or theta, or combinations thereof. These are preferred because they yield a composition having a bright yellow color. Other forms of alumina, such as delta and gamma, can also be used by the present invention. However, these forms produce compositions having colors which are not as bright as those produced by the preferred forms.

The composition is most useful as a pigment when its surface area is about 2–22 m²/g as measured by the BET method using nitrogen gas. This surface area can be obtained by processing the composition in any standard grinding device such as a micronizer or a fluid energy mill.

The composition can be made according to the process of the present invention by intimately mixing one mole of $Bi_2O_3$ with either one mole of $V_2O_5$ or two moles of $NH_4VO_3$, and $x$ moles of $Al_2O_3$ and $y$ moles of $SiO_2$ wherein $x$ is about 0.25–2.0, $y$ is 0.1–3.5, and $x$ plus $y$ is equal to or greater than 1. Then the mixture is heated to about 800°–1100° C. for about 0.5–5.0 hours. Heating can be done in a rotating kiln or a standard furnace. Then it is ground to a surface area of 2–22 meters squared per gram in any standard grinding device to yield a composition with excellent pigmentary properties.

The following examples illustrate this invention. All parts, percentages, and proportions are by weight unless otherwise indicated.

EXAMPLE 1

A mixture of 5.14 g. $Bi_2O_3$, 2.58 g. $NH_4VO_3$, 4.5 g. $\alpha$-$Al_2O_3$, and 0.5 g. $SiO_2$ is thoroughly blended, placed in a porcelain crucible, and heated in air at 900° C. for 0.5 hour to form a composition. The composition is reblended and reheated at 1100° C. for 1 hour. The composition appears as a bright yellow powder and it is wet milled for 15 hours.

The intensity and lightfastness of the composition in a paint are measured from paint drawdowns made to complete hiding. The paint is made by dispersing the composition into a binder in a 2:1 ratio by weight of pigment to binder using a Hoover muller. The binder is composed of 98.9 parts by weight No. 2 transparent varnish made by the Superior Varnish and Drier Company, Merchantsville, N.J.; 1 part by weight, as lead, of lead Nuodex drier (contains 24 percent lead), and 0.1 part by weight, as manganese, of manganese Nuodex drier (contains 6 percent manganese). The drawdowns are dried for about 72–100 hours in a well-ventilated room at 25° C. and less than about 50% humidity.

Intensity is determined by green filter reflectance of a masstone drawdown. Intensity is expressed as percent green filter reflectance measured with a Gardiner Multipurpose Reflectometer Serial No. 40 (Gardiner Laboratory Inc., Bethesda, Md.), using a white reflectance standard at a setting of 86.1 and light from a General Electric CVS projector lamp passed through the green tristimulus filter supplied with the Gardiner Reflectometer.

The Gardiner Multipurpose Reflectometer is described in National Bureau of Standards Research Paper RP 1345 dated November, 1940, by Richard S. Hunter and National Bureau of Standards Circular C 429 dated July 30, 1942, by Richard S. Hunter. The higher the percent reflectance of the drawdown, the more intense the color. The intensity of the composition of Example 1 is such that it has a green filter reflectance of about 66.3 percent.

Lightfastness is determined after fully dried paint drawdowns have been continuously exposed for 44 hours in an Atlas Color Fade-Ometer Type FDA-P. A Gardiner Multipurpose Reflectometer is used as described above to measure green filter reflectance before and after exposure. The percent lowering of reflectance after exposure is percent Fade-Ometer darkening. The lower the percent Fade-Ometer darkening, the better the lightfastness of the pigment. The percent Fade-Ometer darkening for the composition of Example 1 is about 4.2 percent after 44 hours of exposure.

EXAMPLE 2

A control is prepared by thoroughly blending 2.58 g. $NH_4VO_3$ and 5.14 g. $Bi_2O_3$, placing it in a porcelain crucible, and heating it in air at 850° C. for 0.5 hour to form a composition. The composition is a dark brown highly sintered material. After wet agate milling the composition for 15 hours, it has a dull green-yellow color and is not useful as a pigment.

EXAMPLES 3–7

The procedure of Example 1 was repeated using the amounts of $\alpha\text{-}Al_2O_3$ and $SiO_2$ shown in Table I. Intensity and percent Fade-Ometer darkening were obtained from paint drawdowns prepared according to the procedure of Example 1.

TABLE I

| Example | Grams $\alpha\text{-}Al_2O_3$ | Grams $SiO_2$ | x moles of $\alpha\text{-}Al_2O_3$ per mole of $BiVO_4$ | y moles of $SiO_2$ per mole of $BiVO_4$ | Intensity % Green Filter Reflectance | Percent Fade-Ometer[R] Darkening After 44 Hours of Exposure | Color |
|---|---|---|---|---|---|---|---|
| 3 | 4.0 | 1.0 | 1.78 | 0.76 | 66.0 | 3.2 | Bright yellow |
| 4 | 2.5 | 2.5 | 1.11 | 1.91 | 64.0 | 4.8 | Yellow |
| 5 | 1.0 | 4.0 | 0.45 | 3.05 | 63.5 | 3.5 | Yellow |
| 6[1] | 0 | 5.0 | 0 | 3.77 | 49.8 | 14 | Dull brownish-yellow |
| 7[1] | 5.0 | 0 | 2.23 | 0 | 50.3 | 5.4 | Dull brownish-yellow |

[1]The compositions of Examples 6 and 7 are outside the scope of the present invention This shows that Examples 3, 4, and 5, which are within the scope of the present invention, are useful as pigments because they have good color, lightfastness, and intensity. However, Examples 6 and 7, which are outside the scope of the present invention, are not useful as pigments because they have poor pigment properties.

I claim:

1. A composition of the general formula $BiVO_4.xAl_2O_3.ySiO_2$ where $x$ and $y$ represent moles of $Al_2O_3$ and $SiO_2$, respectively, per mole of $BiVO_4$, $x$ is about 0.25–2.0, $y$ is about 0.1–3.5, and $x$ plus $y$ is equal to or greater than 1.

2. The composition of claim 1 wherein $x$ is about 1.0–2.0.

3. The composition of claim 1 wherein $y$ is about 0.25–2.0.

4. The composition of claim 1 wherein $x$ plus $y$ is about 1.0–4.0.

5. The composition of claim 4 wherein $x$ is about 1.0–2.0 and $y$ is about 0.25–2.0.

6. A process for preparing a composition consisting essentially of $BiVO_4$, $Al_2O_3$, and $SiO_2$, comprising: mixing $Bi_2O_3$, $NH_4VO_3$ or $V_2O_5$, $x.Al_2O_3$, and $y.SiO_2$ wherein the Bi and V are present in equimolar amounts, $x$ and $y$ represent moles of $Al_2O_3$ and $SiO_2$, respectively, per mole of $BiVO_4$, $x$ is about 0.25–2.0, $y$ is about 0.1–3.5, and $x$ plus $y$ is equal to or greater than 1; and heating the mixture at about 800°–1100° C. for about 0.5–5.0 hours.

7. The process of claim 6 wherein $x$ is about 1.0–2.0.

8. The process of claim 6 wherein $y$ is about 0.25–2.0.

9. The process of claim 6 wherein $x$ plus $y$ is about 1.0–4.0.

10. The process of claim 9 wherein $x$ is about 1.0–2.0 and $y$ is about 0.25–2.0.

* * * * *